US006829723B1

(12) United States Patent
Bae (10) Patent No.: US 6,829,723 B1
(45) Date of Patent: Dec. 7, 2004

(54) DUPLICATING PROCESSORS AND METHOD FOR CONTROLLING ANOMALOUS DUAL STATE THEREOF

(75) Inventor: Seung-Hwan Bae, Sungnam (KR)

(73) Assignee: LG Information & Communications, Ltd., Seoul (KR)

(*) Notice: Subject to any disclaimer, the term of this patent is extended or adjusted under 35 U.S.C. 154(b) by 750 days.

(21) Appl. No.: 09/614,719

(22) Filed: Jul. 12, 2000

(30) Foreign Application Priority Data

Jul. 14, 1999 (KR) ........................................ 1999-28544

(51) Int. Cl.[7] .............................................. G06F 11/00
(52) U.S. Cl. .......................................... 714/11; 714/12
(58) Field of Search ............................... 714/12, 21, 11

(56) References Cited

U.S. PATENT DOCUMENTS

| | | | | |
|---|---|---|---|---|
| 5,210,861 A | * | 5/1993 | Shimoda ....................... | 714/32 |
| 5,473,771 A | * | 12/1995 | Burd et al. .................... | 714/4 |
| 5,544,077 A | * | 8/1996 | Hershey ....................... | 702/58 |
| 5,848,128 A | * | 12/1998 | Frey ............................ | 379/9 |
| 6,012,150 A | * | 1/2000 | Bartfai et al. .................. | 714/4 |
| 6,023,772 A | * | 2/2000 | Fleming ....................... | 714/13 |
| 6,035,415 A | * | 3/2000 | Fleming ....................... | 714/11 |
| 6,134,673 A | * | 10/2000 | Chrabaszcz .................. | 714/13 |
| 6,266,781 B1 | * | 7/2001 | Chung et al. .................. | 714/4 |
| 6,427,213 B1 | * | 7/2002 | Dao ............................ | 714/12 |
| 6,477,663 B1 | * | 11/2002 | Laranjeira et al. ............. | 714/11 |

OTHER PUBLICATIONS www.dictionary.com; definition of periodic.*

* cited by examiner

Primary Examiner—Nadeem Iqbal
Assistant Examiner—Timothy M. Bonura
(74) Attorney, Agent, or Firm—Fleshner & Kim, LLP

(57) ABSTRACT

A method for controlling anomalous dual state of duplicated processors for a fault-tolerant system having a first and a second processors that are connected to each other through network, comprising: a first step of transmitting its own state information of either the first or the second processor to mutually another processor (twin) by using different transmission period to each other; a second step of receiving the heartbeat applied from the other processor and recognizing state information of the twin; and a third step of performing duplication states according to the state information of the twin. By doing that, when the two processors start, the seeds for random numbers are differently allocated to generate different random numbers, and the heartbeat transmission period is continuously changed by using the random numbers to differentiate the transmission and receiving time of the heartbeat between the two processors. Therefore, an anomalous dual state transition, that is, a state fluctuation phenomenon that dual ACTIVE and dual STANDBY are repeatedly performed that may occur in concurrently receiving the heartbeat by two processors, can be prevented from occurring.

31 Claims, 5 Drawing Sheets

DUPLICATING PROCESSORS AND METHOD FOR CONTROLLING ANOMALOUS DUAL STATE THEREOF

BACKGROUND OF THE INVENTION

1. Field of the Invention

The present invention relates to a communication system, and more particularly, to duplicating processors and a method for controlling anomalous dual state of the duplicated processors.

2. Description of the Background Art

Generally, in order to improve reliability and stability in service of a communication system, a hardware path that transmits data is implemented by duplicating (active mode/ standby mode), of which an active path is set at an initial stage through which data is transmitted, and if a disturbance occurs in the active path, a separately provided standby path is automatically switched to successively operated.

However, a communication system having the tightly coupled active/standby scheme that is physically constructed by hardware has disadvantages. The hardware architecture should be redesigned and a new operating system on it should be required. In addition, expense and time are required too much to develop a new programming language.

Figure 1:
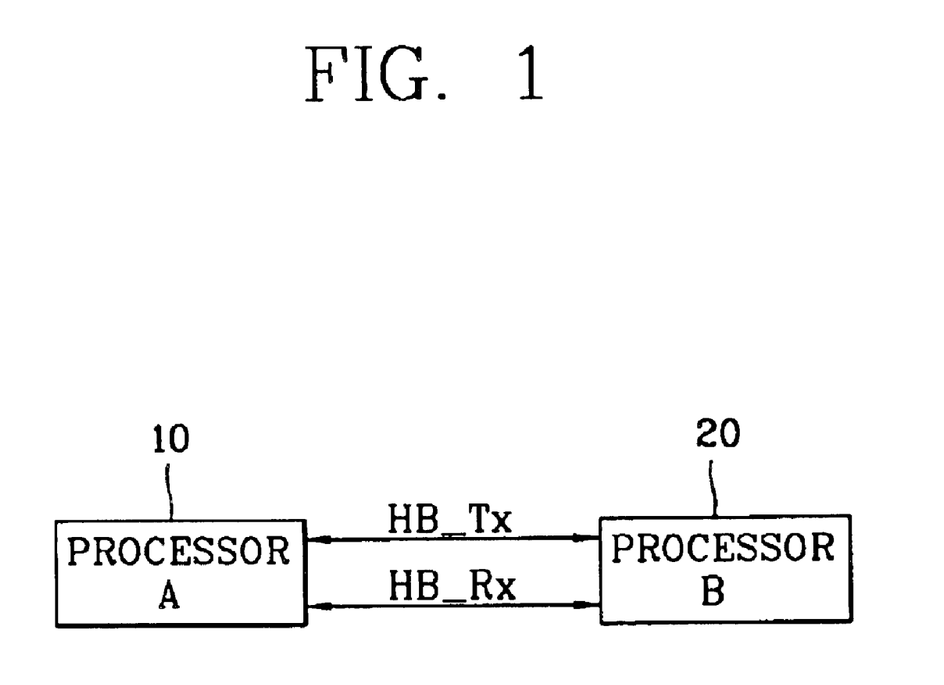
FIG. 1 is a block diagram illustrating a simple duplication architecture of a system through network in accordance with a conventional art and the present invention.

In an effort to overcome the drawbacks, as shown in FIG. 1, recent communication systems are established in that two processors 10 and 20 are loosely coupled through a network and heartbeat signals (HB_Tx/HB_Rx) that are periodically transmitted and received between the processors are used to process the duplication state by software.

For this purpose, the processors 10 and 20 respectively include blocks for performing the duplication function.

Figure 2:
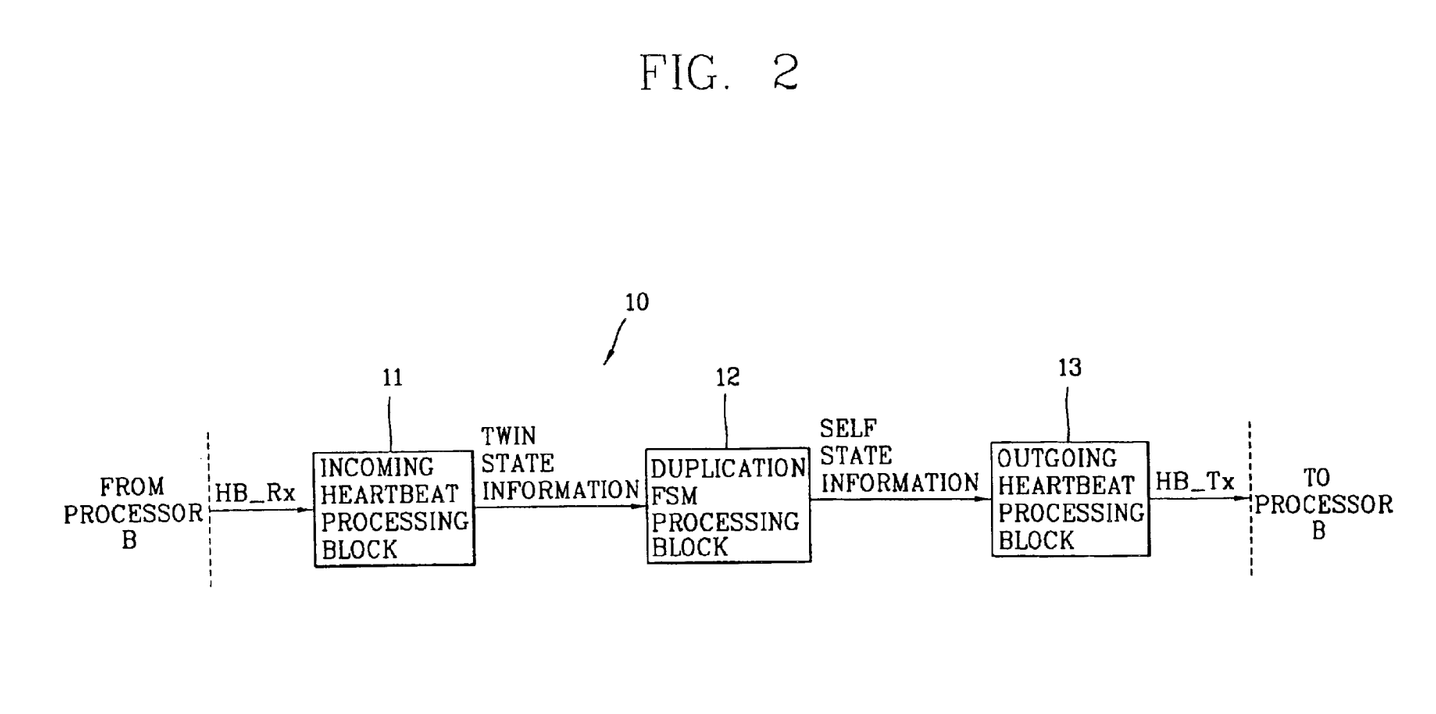
FIG. 2 is a block diagram illustrating blocks for performing duplication process in each processor in accordance with the conventional art and the present invention.

With reference to FIG. 2, the processor A 10 includes an incoming heartbeat processing block 11, a duplication FSM (Finite State Machine) processing block 12 and an outgoing heartbeat processing block 13. The processor B 20 has the same flow.

The incoming heartbeat processing block 11 receives a heartbeat (HB_Rx) from the processor B 20, that is, the other processor (twin) and transfers state information of the twin 20 to the duplication FSM processing block 12. If no heartbeat is received from the twin 20 within a predetermined time, it reports a network disturbance or a twin down to the duplication FSM processing block 12.

The duplication FSM processing block 12 is charged with a corresponding state transition function according to the state information of the twin 20 included in the heartbeat (HB_Rx) or a switching event captured by the incoming heartbeat processing block 11, so that it applies the state information of itself corresponding to each state to the outgoing heartbeat processing block 13 or renders the outgoing heartbeat processing block 13 to transmit a heartbeat signal immediately in every state transition.

The outgoing heartbeat processing block 13 transmits the heartbeat (HB_Tx) to the twin 20 immediately or periodically according to the state information applied from the duplication FSM processing block 12.

Figure 3:
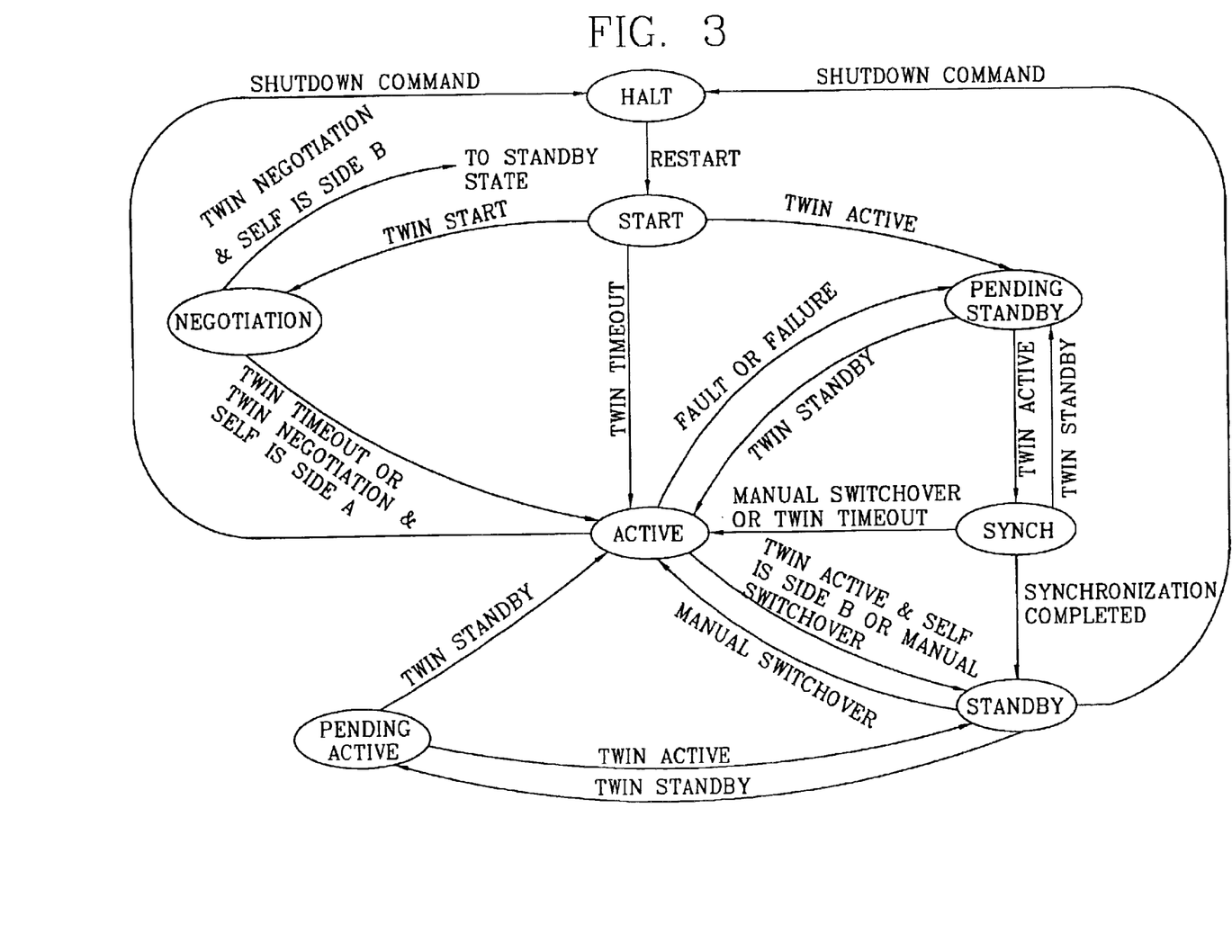
FIG. 3 illustrates a duplication FSM diagram in a duplication FSM processing block in accordance with the conventional art and the present invention.

FIG. 3 illustrates a state transition of the duplication FSM block in accordance with a conventional art.

The state transition process in accordance with the conventional art will now be described with reference to FIG. 3.

Each state transition is made by a twin state event such as 'Twin START', 'Twin ACTIVE' or 'Twin TIMEOUT' or by an external event such as 'Shutdown Command', 'Restart' or 'Manual Switchover'.

First, as the FSM is driven and all blocks on overall system are completely initialized, the duplication FSM allows the "INITIAL" state to transit to the "START" state.

And, the self processor confirms a state of the twin, and if the twin has been also started, the self processor is transited to 'NEGOTIATION' state to determine which side gives services as an active one. In the 'NEGOTIATION' state, it was predetermined that which of either one of two processors is to be active.

For example, if the processor A is set as an active processor, each processor confirms whether itself is the processor A in the 'NEGOTIATION' state. If either processor confirms itself as the processor A, it is transited to 'ACTIVE' state, or otherwise, it is transited to 'STANDBY' state.

Meanwhile, when the processor A is in 'ACTIVE' state, if the twin is in 'ACTIVE' state or if 'Manual switchover' occurs, the processor A is transited to 'STANDBY' state. And, if a network error or a disturbance occurs, the processor A is transited to 'PENDING STANDBY' state.

When the processor A is in 'PENDING STANDBY' state, it confirms a state of twin, and if the twin that is, the processor B is in 'ACTIVE' state, the processor A is transited to a 'SYNCH' state and then transited to 'STANDBY' state when synchronization is completed, while if the processor B is in 'STANDBY' state, the processor A is transited to 'ACTIVE' state.

Meanwhile, in case that the 'Manual switchover' occurs or the processor B is 'Timeout' before synchronization is completed, the processor A is transited to 'ACTIVE' state.

When the processor A is in 'STANDBY' state, if 'Manual switchover' occurs, the processor A is transited to 'ACTIVE' state. In case that the twin (processor B) is in 'STANDBY' state, the processor A is transited to 'PENDING ACTIVE' state and confirms a state of the twin. If the processor B is in 'STANDBY' state, the processor A is transited to 'ACTIVE' state, or otherwise, it is transited to 'STANDBY' state.

However, in case that the duplication is implemented by software through network as described above, there is a possibility that the network disturbance occurs or the network resources such as a cable or a hub are defected or disturbed. Then, each processor would judge that the twin has gone down, resulting in that both processors become active, which makes a confusion for external network elements/participants that mutually works with the processors, causing a problem failing to perform a normal operation.

In addition, even though the disturbance is restored, at just the time of restoration of the disturbance, it may fall to an anomalous dual state, though it happens at few random.

Moreover, if the two processors become all 'ACTIVE' state, since they recognize the other party as being in 'ACTIVE' state based on the received heartbeat, itself is accordingly transited to the 'STANDBY' state immediately. Meanwhile, in case that the two processors become all in 'STANDBY' state, since they recognize the other party as being in 'STANDBY' state based on the received heartbeat, itself is accordingly transited to the 'PENDING ACTIVE' state immediately. The difficulty is met in case that the twin may do the same action at the time.

If the twin is not the 'PENDING ACTIVE' nor 'ACTIVE', itself is transited to the 'ACTIVE' state. In this respect, normally, there is time differences to an extent in receiving the heartbeat, so that it may be prevented from falling into a double active state out of the 'PENDING ACTIVE' state.

That is, at this stage, differences are made in the receiving intervals of the heartbeat, so that the party that first reaches the 'PENDING ACTIVE' state is transited to an active state and the party that reaches later is transited to the 'STANDBY' state, thereby maintaining a normal state.

However, if the heartbeat is transmitted or received at the accurately same time, an anomalous dual active/standby state is inevitably caused. Then, a state fluctuation phenomenon may occur that transition is made to the dual active/standby state, failing to perform a normal duplication.

SUMMARY OF THE INVENTION

Therefore, an object of the present invention is to provide duplicating processors and a method for controlling anomalous dual state in which seeds for generating random numbers are differently allocated when each processor is initialized to generate the different random number and transmission period of a heartbeat is continuously changed by using the random number, thereby avoiding an anomalous dual state.

Another object of the present invention is to provide a method for controlling duplicating processors which is capable of quickly restoring an anomalous dual state even though it occurs due to an abnormally on a network or on a system.

To achieve these and other advantages and in accordance with the purpose of the present invention, as embodied and broadly described herein, there is provided a method for controlling anomalous dual state of duplicated processors for a duplication system having a first and a second processors that are connected to each other through network, including the steps of: transmitting its own state information of either the first or the second processor to mutually another processor (twin) by using different transmission period to each other; receiving the heartbeat applied from the other processor and recognizing state information of the twin; and performing duplication states according to the state information of the twin.

In order to achieve the above objects, there is also provided duplicating processors in a fault-tolerant system having a first and a second processors that are mutually connected through a network, of which each processor has an outgoing heartbeat processing block for transmitting a heartbeat including its own state information to the other processor (twin) by using a different period to each other; an incoming heartbeat processing block for receiving the heartbeat from the other processor and recognizing the state information of the twin; and a duplication FSM processing block for performing duplication states processing according to the state information of the twin.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The construction of a basic duplicated system for executing the present invention is the same as those of FIGS. 1 and 2 and its duplication state transition process is the same as that of FIG. 3, for which, thus, descriptions are omitted.

Figure 4:
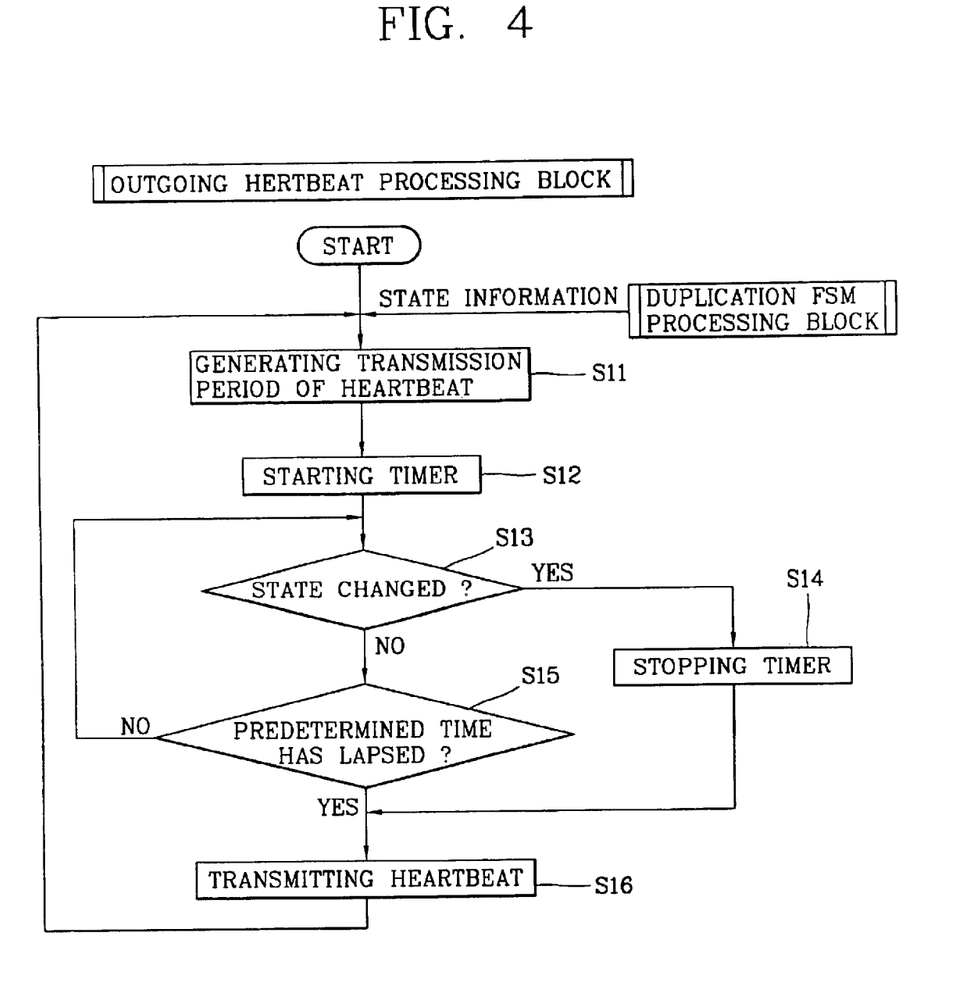
FIG. 4 is a flow chart of a process for transmitting a heartbeat of a outgoing heartbeat processing block in accordance with the present invention.
Figure 5:
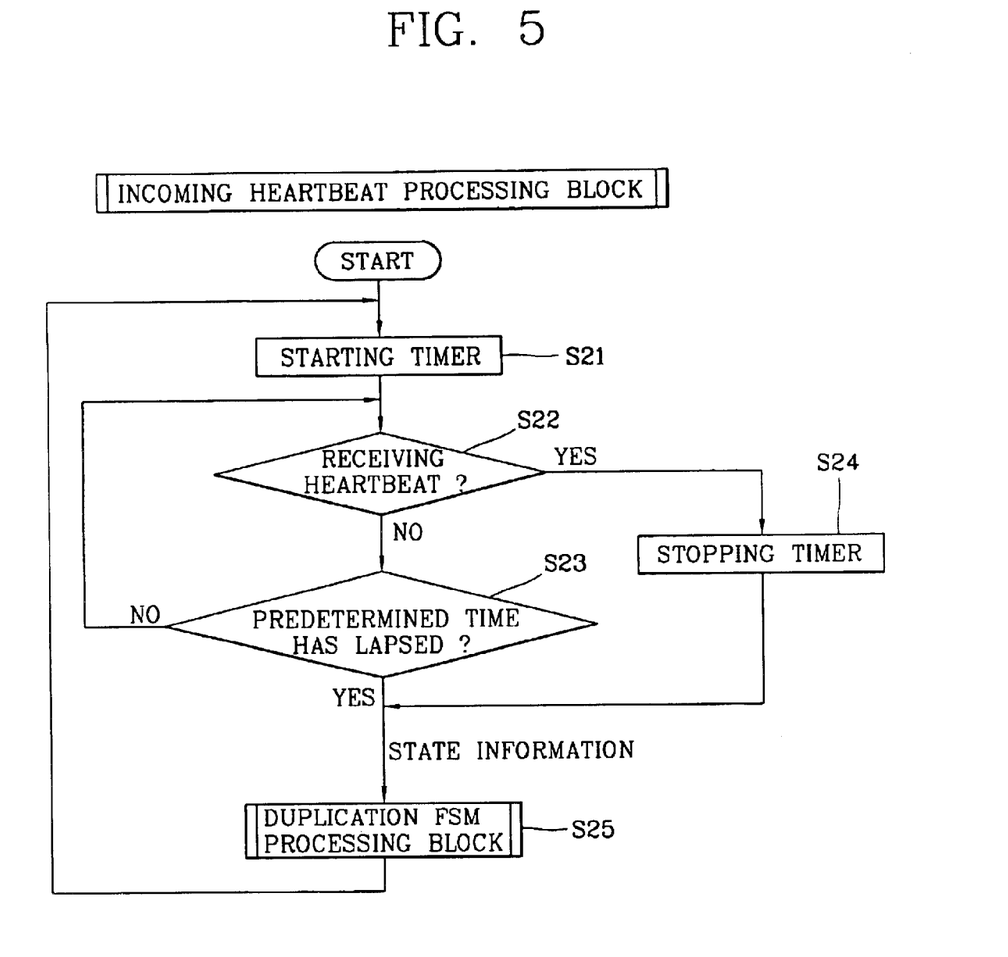
FIG. 5 is a flow chart of a process for receiving heartbeat of an incoming heartbeat processing block in accordance with the present invention.

FIG. 4 is a flow chart of a process for transmitting a heartbeat of an outgoing heartbeat processing block in accordance with the present invention; and FIG. 5 is a flow chart of a process for receiving heartbeat of an incoming heartbeat processing block in accordance with the present invention.

The process for controlling duplication state of a processor in accordance with the present invention will now be described with reference to the accompanying drawings.

The duplicated processors A and B 10 and 20 use heartbeats (HB_Tx/HB_Rx) that are mutually transmitted and received therebetween to inform the twin of its own state information and monitor the state of the twin. In this respect, in order to produce a continuous difference for the heartbeat transmission intervals, random number periods are generated.

For this purpose, first, when each processor 10 and 20 is initialized, seeds for different random numbers are allocated to generate random numbers, and the time tuned by a generated random number is used as a transmission period of the heartbeat of the outgoing heartbeat processing block 13.

In order to generate a suitable tuned period, an average transmission time 'a' through a link between the processors A and B 10 and 20, an average heartbeat processing time of processors 'b' and a state transition time 'c' should be considered.

Before each processor receives nth heartbeat from the twin, each processor should be already completed processing of the n−1th heartbeat and only one heartbeat message at its maximum should exist in the transmission path of a corresponding heartbeat at the point of a specific time.

Accordingly, a fixed-period heartbeat transmission period 'x' should satisfy the following formula: $0<(2a+b+c)<x$. And, assuming that a heartbeat transmission period to be changed is 'p', the variable period and a maximum tolerance of a period change, that is, $|p-x|$ is '$\Delta p$', since $(2a+b+c)$ becomes the maximum value that can be included in '$\Delta p$', $(2a+b+c)<x/2$. Accordingly, $(2a+b+c)$ should satisfy the following formula: $0<2(2a+b+c)<x$.

In this respect, if the change in the heartbeat is desired to be in a predetermined suitable range, that is, in the range from $(x-\Delta p)$ to $(x+\Delta p)$, the current heartbeat should be within the next heartbeat transmission time. Besides, in consideration of the time required for receiving and processing, the transmission period 'p' to be changed should satisfy the following formula: $x-(2a+b+c)<p<x+(2a+b+c)$.

Accordingly, $-(2a+b+c)<p-x<(2a+b+c)$, that is, $|p-x|<(2a+b+c)$. In this respect, on the basis of the above definition, since $\Delta p=|p-x|$, $\Delta p<(2a+b+c)$.

The above formula can be extended to the following formula: $(2a+b+c)<x-(2a+b+c)<p<3(2a+b+c)<x+(2a+b+c)$.

Therefore, the maximum tolerance of the period change '$\Delta p$' should be within $(2a+b+c)$, and the transmission period 'p' to which the change is actually applied should be continuously changed in the range from $x-(2a+b+c)$ to $x+(2a+b+c)$.

The random generation process will now be described according to an embodiment based on an experiment.

Values 'a', 'b' and 'c' may be varied depending on the system specification and a network environment. In this case, they can be set by correcting a configuration by tuning when a system is set up.

In the experiment, a value obtained by averaging values simply measured for 10 times on the basis of a TX1A system was used. For the simplicity, we used a configuration file as the way of storing measured values.

Test system: SPARC 10 dual CPU Unix Processor Board
x: the fixed heartbeat period: 500 ms
a: an average transmission time: 14.7 ms
b: an average heartbeat processing time: 1.2 ms
c: an average a state transition time: 2.8 ms
$(2a+b+c)=33.4$ ms>$|p-x|$
In a configuration file,
AD.HB.VAR_LIMIT_SEC=0
AD.HB.VAR_LIMIT_USEC=33400
AD.HB.PERIOD_SEC=0
AD.HB.PERIOD_USEC=500000

. . .

variable seed: a random seed variable hbVarLimit: a limit that heartbeat period can vary variable x: the fixed heartbeat period variable prevrange: the old varied range within the limit variable newrange: the new acceptable range to be varied at a new period within the limit variable p: the heartbeat period to be newly changed

*** the time unit of the above all period related variables is micro second.

```
/* pseudo code for initialization of a system */
concern the unique processor id as the random seed and assign it to a
variable seed ;
        /* seed = processor_id ; */
initialize the random number generator with the seed value ;
        /* randomize(seed) ; */
read an environment variable VAT_LIMIT_USEC and store it to a variable
hbVarLimit
        /* hbVarLimit = get_parameter(HB.VAR_LIMIT_USEC) ; */
read an environment variable PERIOD_USEC and store it to a variable x ;
        /* x = get_parameter(HB.PERIOD_USEC) ; */
initialize a variable prevrange ;
        /* prevrange = 0 */
. . .
/* pseudo code in outgoing heartbeat processing block */
{
choose a random number in the range of hbVarLimit and assign it to a
varialble newrange;
        /* newrange = random( ) % hbVarLimit + 1; 1~33400 */
determine the sign of the newrange ;
        /* newrange * = (random( ) % 2 ? 1: -1) ; by dividing the value by 2, if a
remainder is 1, it gets +value, while if the remainder is 0, it gets -value */
        assign the newly modified period to a variable x ;
        /* p = x -prevrange + newrange ; a previous modified value is corrected
to give a change in the fixed period */
        cancel the previous timer
        /* cancel_time (outgoingTimer_) ; a previous timer is finished */
        schedule a new timer to execute sendHeartbeatFunction block after p
micro seconds
        /* outgoingTimer = schedule_time (thisObject, sendHeartbeatFunction,
0, p ; sec = 0, usec = p */
        store the newrange as a prevrange
        /* prevrange = newrange ; */
}
```

The heartbeat transmission process of the outgoing heartbeat processing block 13 in which the heartbeat is transmitted by generating the random numbers will now be described with reference to FIG. 4.

First, in order to transmit state information applied from the duplication FSM processing block 12 to the twin, the random numbers are generated according to the above-stated process and used to generate the transmission period of a heartbeat (S11).

And then, a timer is scheduled and started (S12). As a transmission time determined at step S11 lapses (S15), a heartbeat carrying self state information is transmitted to the twin (S16), and then it returns to the step S11.

When the outgoing heartbeat processing block 13 transmits the heartbeat through the above process, the incoming heartbeat processing block of the other processor receives the heartbeat and informs its own duplication FSM processing block of the state information of the twin, as shown in FIG. 5.

First, the incoming heartbeat processing block schedules and starts the timer (S21) and waits for the heartbeat to be transmitted from the twin for a predetermined time. In this respect, the predetermined time is determined as a sufficient value greater than the maximum value of the heartbeat transmission period.

When the incoming heartbeat processing block receives the heartbeat from the twin within a predetermined time (S22), it stops the timer (S24) and transmits the received state information of the twin to the duplication FSM processing block (S25), and goes back to step S21.

Meanwhile, if no heartbeat is transmitted from the twin until a predetermined time lapses, the incoming heartbeat processing block judges that the twin has been down, and transmits information related to the down to the duplication FSM block (S25).

As so far described, according to the method for controlling duplicated processors of the present invention, when the two processors start, seeds for the random number are differently allocated to generate different random numbers, and the heartbeat transmission period is continuously changed by using the random numbers to differentiate the transmission and receiving time of the heartbeat between the two processors. Therefore, an anomalous dual state transition, that is, a state fluctuation phenomenon that dual ACTIVE and dual STANDBY are repeatedly performed that may occur in concurrently receiving the heartbeat by two processors, can be prevented from occurring.

In addition, at the time when a network-related disturbance is restored, since each transmission period of the two processors is differently changed to each other, so that a prompt restoration can be ensured.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for controlling anomalous dual state of duplicated processors for a fault-tolerant system having a first and a second processors that are connected to each other through network, comprising:
   a first step of transmitting its own state information of either the first or the second processor to mutually another processor (twin) by generating different transmission period to each other by using random numbers;
   a second step of receiving a heartbeat applied from the other processor and recognizing state information of the twin; and
   a third step of performing duplication states according to the state information of the twin.

2. The method according to claim 1, wherein the first step includes sub-steps of:
   generating a heartbeat transmission period by using random numbers;
   scheduling and starting a timer on the basis of the generated random period; and
   transmitting a heartbeat to the other processor after time tuned by a generated random number lapses.

3. The method according to claim 2, wherein when the random period is generated, in order for the first and the second processors to have the different tuned period to each other, different seeds for random numbers are allocated to each other, when a system is initialized.

4. The method according to claim 2, further comprising a step of: stopping the timer in case that state change occurs before the period tuned by a generated random number lapses, and immediately transmitting a corresponding heartbeat to the other processor.

5. The method according to claim 4, wherein the period tuned by a generated random number of the heartbeat is determined by a value changed from a fixed heartbeat transmission period in consideration of a corresponding heartbeat transmission time, a heartbeat processing time and a state transition time.

6. The method according to claim 5, wherein assuming that a fixed heartbeat transmission period is 'x', the heartbeat transmission time is 'a', the heartbeat processing time is 'b' and the state transition time is 'c', the variable heartbeat transmission period is determined in the range from $x-(2a+b+c)$ to $x+(2a+b+c)$.

7. The method according to claim 2, wherein the period tuned by a generated random number of the heartbeat is determined so that only one heartbeat message at its maximum exists in a corresponding heartbeat transmission path at the point of a specific time.

8. The method according to claim 1, wherein the second step comprising the sub-step of:
   waiting for receiving the heartbeat for a predetermined time;
   recognizing a receipt of the heartbeat; and
   judging that the twin has gone down if no heartbeat is received within a predetermined time.

9. The method according to claim 8, wherein the predetermined time refers to a value sufficiently greater than the maximum value that can be held by the period tuned by a generated random number for a heartbeat transmission.

10. Duplicated processors on a fault-tolerant system having a first and a second processors that are mutually connected through a network, wherein each processor comprising:
    an outgoing heartbeat processing block for transmitting a heartbeat including its own state information to the other processor (twin) by using a different transmission period to each other;
    an incoming heartbeat block for receiving the heartbeat from the other processor and recognizing the state information of the twin; and
    a duplication FSM processing block for performing duplication states processing according to the state information of the twin,
    wherein the outgoing heartbeat processing block includes a random number generator to continuously change the transmission period of the heartbeat.

11. The processor according to claim 10, wherein when the random period is generated, in order for the first and the second processors to have the different turned period to each other, different seeds for random numbers are allocated to each other, when a system is initialized.

12. The processor according to claim 10, wherein the period turned by a generated random number of the heartbeat is determined so that only one heartbeat message at its maximum exists in a corresponding heartbeat transmission path at a specific time point.

13. The processor according to claim 10, wherein the period turned by a generated random number of the heartbeat is determined by a value changed from a fixed heartbeat transmission period in consideration of a corresponding heartbeat transmission time, a heartbeat processing time and a state transition time.

14. The processor according to claim 13, wherein assuming that a fixed heartbeat transmission period is 'x', the heartbeat transmission time is 'a', the heartbeat processing time is 'b' and the state transition time is 'c', the variable heartbeat transmission period is determined in the range from x−(2a+b+c) to x+(2a+b+c).

15. The processor according to claim 10, wherein the incoming heartbeat processing block includes a timer to watch whether predetermined time has lapsed.

16. The processor according to claim 15, wherein the predetermined time is a sufficient value that is greater than the maximum value of the heartbeat transmission period.

17. The processor according to claim 15, wherein the incoming heartbeat processing block schedules and starts the timer and waits for the heartbeat to be transmitted for a predetermined time.

18. The processor according to claim 15, wherein the timer is stopped, when the incoming heartbeat processing block receives the heartbeat from the twin within a predetermined time.

19. The processor according to claim 18, herein the incoming heartbeat processing block transmits the received state information of the twin to the duplication FSM processing block.

20. A method for transmitting a heartbeat of duplicated processors on a fault-tolerant system having a first and a second processors that are connected through network, in which the first and the second processors use different transmission periods to transmit heartbeats, and wherein to generate the different transmission periods to each other, different seeds for random numbers are allocated to the first and the second processors to generate random numbers.

21. The method according to claim 20, wherein the period turned by a generated random number of the heartbeat is determined so that only one heartbeat message at its maximum exists in a corresponding heartbeat transmission path at the point of a specific time.

22. The method according to claim 20, wherein the period turned by a generated random number of the heartbeat is determined by a value changed from a fixed heartbeat transmission period in consideration of a corresponding heartbeat transmission time, a heartbeat processing time and a state transition time.

23. The method according to claim 22, wherein assuming that a fixed heartbeat transmission period is 'x', the heartbeat transmission time is 'a', the heartbeat procession time is 'b' and the state transition time is 'c', the variable heartbeat transmission period of the heartbeat is determined in the range from x−(2a+b+c) to x+(2a+b+c).

24. A method comprising:
   randomly setting a transmission period of at least one message,
   wherein said at least one message comprising state information of a first processor, and said randomly setting a transmission period is implemented by a random number generator.

25. The method of claim 24, wherein said at least one message is a heartbeat message.

26. The method of claim 24, wherein the first processor is one of at least two twin processors.

27. The method of claim 26, wherein:
   said at least one message is for maintaining said at least two twin processors; and
   said at least two twin processors are similarly configured so that each processor of at least two twin processors can provide backup in the event of a failure.

28. An apparatus comprising:
   a random number generator to randomly set a transmission period of at least one message,
   wherein said at least one message comprising state information of a first processor.

29. The apparatus of claim 28, wherein said at least one message is a heartbeat message.

30. The apparatus of claim 28, wherein the first processor is one of at least two twin processors.

31. The apparatus of claim 30, wherein:
   said at least one message is for maintaining said two at least twin processors; and
   said at least two twin processors are similarly configured to that each processor of at least two twin processors can provide backup in the event of a failure.

* * * * *